(12) United States Patent
Mishra et al.

(10) Patent No.: US 6,712,916 B2
(45) Date of Patent: Mar. 30, 2004

(54) METAL SUPERPLASTICITY ENHANCEMENT AND FORMING PROCESS

(75) Inventors: Rajiv S. Mishra, Rolla, MO (US); Murray W. Mahoney, 1584 N. Calle La Cumbre, Camarillo, CA (US) 93010

(73) Assignees: The Curators of the University of Missouri, Columbia, MO (US); Murray W. Mahoney, Camarillo, CA (US)

(*) Notice: Subject to any disclaimer, the term of this patent is extended or adjusted under 35 U.S.C. 154(b) by 33 days.

(21) Appl. No.: 10/036,709

(22) Filed: Dec. 21, 2001

(65) Prior Publication Data

US 2002/0079351 A1 Jun. 27, 2002

Related U.S. Application Data

(60) Provisional application No. 60/257,990, filed on Dec. 22, 2000.

(51) Int. Cl.$^7$ .............................. C22F 1/00; B23K 20/12
(52) U.S. Cl. .................... 148/564; 228/112.1; 228/155
(58) Field of Search .............................. 228/2.1, 112.1, 228/155–163; 148/516, 527, 902, 907, 564; 72/57, 68, 709

(56) References Cited

U.S. PATENT DOCUMENTS

| | | | |
|---|---|---|---|
| 5,324,368 A | 6/1994 | Masumoto et al. | |
| 5,460,317 A | 10/1995 | Thomas et al. | |
| 5,718,366 A | 2/1998 | Colligan | |
| 5,794,835 A | 8/1998 | Colligan et al. | |
| 6,053,391 A | * 4/2000 | Heideman et al. | 228/2.1 |
| 6,138,895 A | * 10/2000 | Oelgoetz et al. | 228/112.1 |
| 6,227,430 B1 | 5/2001 | Rosen et al. | |
| 6,257,479 B1 | 7/2001 | Litwinski et al. | |
| 6,298,962 B1 | * 10/2001 | Kato et al. | 188/371 |
| 6,299,050 B1 | 10/2001 | Okamura et al. | |
| 6,302,315 B1 | 10/2001 | Thompson | |
| 6,398,883 B1 | * 6/2002 | Forrest et al. | 148/516 |
| 6,537,682 B2 | * 3/2003 | Colligan | |
| 6,568,582 B2 | * 5/2003 | Colligan | |
| 2002/0079351 A1 | * 6/2002 | Mishra et al. | |

FOREIGN PATENT DOCUMENTS

| | | | |
|---|---|---|---|
| JP | 441047859 A | * | 2/1999 |
| JP | 02001047260 A | * | 2/2001 |
| WO | WO 93/10935 | | 6/1993 |

OTHER PUBLICATIONS

Mishra, et al., High Strain Rate Superplasticity in a Friction Stir Processed 7075 Al Alloy, Scripta matter. 42 (2000) 163–168 (Jan. 14, 2000 [publication mailed]; and Dec. 31, 1999 [publication posted on the internet], .

Mishra, et al., Friction Stir Processing: A New Grain Refinement Technique to Achieve High Strain Superplasticity in Commercial Alloys, Superplasticity in Advance Materials, ICSAM–2000 Materials Science Forum, 357–3; 507 (subject matter presented orally at Forum on Aug. 1, 2000).

Mahoney et al., Properties of Friction–Stir–Welded 7075 T651 Aluminum, Metallurgical and Materials Transactions, vol. 29A, Jul. 1998, pp. 1955–1964.

Rhodes et al., Effects of Friction Stir Welding on Microstructure of 7075 Aluminum, Scripta Materialia, vol. 36, No. 1, 1997, pp. 69–75.

Inoue et al., Viscous Flow Deformation in Supercooled Liquid State of Bulk Amorphous $Zr_{55}Al_{10}Ni_5Cu_{30}$ Alloy, Materials Transactions, Jim, vol. 37, No. 6 (1996), pp. 1337 to 1341.

\* cited by examiner

*Primary Examiner*—Kiley Stoner
(74) *Attorney, Agent, or Firm*—Senniger, Powers, Leavitt & Roedel

(57) ABSTRACT

A shaped metallic component is formed by friction stirring at least a segment of a single piece of bulk metal to impart superplasticity thereto and thereby yield a single superplastic metal blank from the single piece of bulk metal. The metal blank is then deformed by a metal deformation process such as forging, rolling, drawing, bending, extruding, gas forming, punching, and stamping.

30 Claims, 13 Drawing Sheets

METAL SUPERPLASTICITY ENHANCEMENT AND FORMING PROCESS

REFERENCE TO RELATED APPLICATION

This is a non-provisional application based on provisional application 60/257,990 filed Dec. 22, 2000.

BACKGROUND OF THE INVENTION

The invention relates to a method of forming metallic components by forging, rolling, drawing, bending, extruding, gas forming, stamping or other method involving deformation of metal into a desired metallic shape.

In forming intricate shapes and thin shapes from metal by traditional methods such as stamping and extruding, ductility of the metal and has been a limiting factor in preventing the manufacture of small shapes, thin shapes, and intricate shapes of unitary structure (i.e., without metals joining). In particular, when metal of a particular thickness is deformed beyond a certain point, it ruptures.

Superplasticity, generally, is the capacity of metal to undergo larger uniform plastic deformation without rupture. Structural superplasticity has been defined many ways, but for purposes of this description refers to the ability of a metal to undergo more than about 200% elongation under tension without rupturing. High strain rate superplasticity is defined as a minimum strain rate of $10^{-2}$ $s^{-1}$ (Glossary of Terms Used in Metallic Superplastic Materials, JIS-H-7007, p. 3, Japanese Standards Association, Tokyo, Japan (1995)).

Metals have been treated by a variety of methods to impart superplasticity to enable the formation of small and intricate components. As a general proposition, with aluminum alloys, superplasticity is imparted by treating the metal to yield a fine grain size of less than about 20 microns and high angle grain boundaries.

The widespread use of superplastic forming of aluminum alloys is hampered by the slow optimum strain rate for superplasticity, particularly in commercial aluminum alloys. In particular, optimum strain rates typically are 2 to $10 \times 10^{-4}$ $s^{-1}$ for conventionally fabricated superplastic aluminum alloys. Using this material at higher strain rates, ductility is reduced and deformation is more of a diffuse necking rather than uniform extension by superplastic forming. In addition, elaborate thermo-mechanical processing has been necessary to obtain a microstructure conducive to superplastic deformation. This processing limits the versatility for subsequent superplastic forming and adds considerably to the cost.

With conventional superplastic materials, a through thickness fine grain microstructure can only be obtained in relatively thin sheet, approximately 2.5 mm or less. Further, for structural aluminum alloys, the practical limit for grain size has been on the order of 8 microns. With the friction stir processing of the invention, the grain size achievable is significantly less, on the order of down to about 3 microns or below, resulting in higher uniform elongation, facilitating fabrication of more complex shapes and at higher strain rates.

Paton et al. (J. Metals, 34(8), 21 (1982)) developed a four-step thermo-mechanical processing treatment to obtain grain sizes in the range of 8–14 microns in commercial 7075 and 7475 aluminum alloys. The 7075 Al alloy exhibited optimum superplastic behavior at a temperature of 516 C. and a strain rate of $2 \times 10^{-4}$ $s^{-1}$.

Xinggang et al. (Metall. Trans. 24A, 2596 (1996); Acta Metall. Mater. 41, 2721 (1993)) have refined the thermo-mechanical processing of 7075 Al alloy to increase the optimum strain rate to $8.3 \times 10^{-4}$ $s^{-1}$ at 510 C. The improved thermo-mechanical processing involved solution treatment, averaging, multiple warm rolling passes (200–220 C.) with intermittent re-heating and a final recrystallization treatment. The thermo-mechanical processing is complex and still the optimum superplastic strain rate is an order of magnitude slower than desirable for widespread use of superplastic forging/forming of components in automotive and other industries.

Severe plastic deformation (SePD) processing approaches such as equal channel angular extrusion (ECAE) have been used to achieve superplasticity. Berbon et al. have used ECAE to obtain high strain rate superplasticity in a commercial 1420 Al alloy at significantly lower temperature. (Metall. Mater. Trans. 29A, 2237 (1998)). A typical grain refinement schedule by ECAE consists of 8–10 passes at intermediate temperatures. An even higher shift in optimum superplastic strain rate and decrease to lower temperature were demonstrated by Mishra et al. in a 1420 Al alloy processed by torsional strain (TS)-SePD. (J. Metals 51(1), 37 (1999)). TS-SePD produces a nanocrystalline (average grain size less than 100 nanometers) microstructure but the process is limited to a very small specimen size, typically 20 mm in diameter and 0.5–1 mm thick, and is not practical for commercial superplastic forming operations.

Accordingly, there is a practical need to develop processing techniques to shift the optimum superplastic strain rate to at least $10^{-2}$ $s^{-1}$ in commercial aluminum alloys and other metals produced by casting and powder metallurgical techniques.

SUMMARY OF THE INVENTION

It is an object of the invention, therefore, to provide a process for enhancing the superplasticity of metal and forming shapes therefrom; which process is suitable for use with aluminum alloys; which process is economical; which process is suitable for use with thin cross sections; which process is suitable for use with thick cross sections; which process achieves high strain rate superplastic forming of commercial alloys; which process achieves selective superplastic forming; which process is suitable for use with cast sheets; which process is suitable for use with hot-pressed powder metallurgy sheets; and which process imparts superplasticity in contoured sheets to achieve uniform thickness.

Briefly, therefore, the invention is directed to a method for producing a shaped metallic component involving friction stirring at least a segment of a single piece of bulk metal to impart superplasticity thereto and thereby yield a single superplastic metal blank from said single piece of bulk metal; and deforming the superplastic metal blank to yield a shaped metallic component.

Other objects and features of the invention will be in part apparent and in part pointed out hereinafter.

DETAILED DESCRIPTION OF THE PREFERRED EMBODIMENTS

Figure 1:
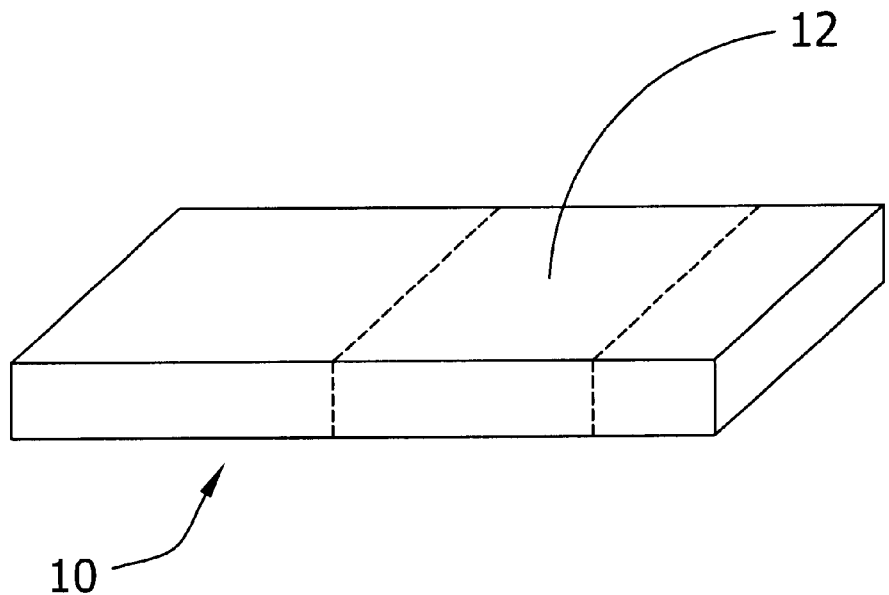
FIGS. 1 and 2 are perspectives of a piece of material before and after the forming process of the invention.

In accordance with this invention, high strain rate superplasticity (strain rate $>10^{-2}$ s$^{-1}$) is imparted to a bulk metal (e.g., aluminum alloys, steels, copper alloys, magnesium alloys, metal matrix composites, etc.) work piece by a friction stir process. This component of the process is accomplished by inserting a probe into the material and rotating the probe to produce extensive plastic deformation through a stirring action. The probe is caused to traverse the segment of the bulk metal which is to be treated. Localized heating is produced by friction between the rotating probe and the bulk metal. There is also a tool shoulder carried by the probe which causes localized heating via friction between the shoulder and the external surface of the bulk metal. This results in a stirred zone with a very fine fully recrystallized grain size in a single pass.

Friction stirring tools of the type suitable for carrying out the friction stirring component of the invention are known in the art as disclosed, for example, in U.S. Pat. Nos. 5,460, 317; 5,718,366; 6,227,430; 6,138,895; 5,794,835; and 6,299,050. A single piece of bulk metal is subjected to a traversing friction stir probe to yield an especially fine grain size. In accordance with this invention the average grain size is reduced by more than about 20%, preferably more than about 40%. In one particular embodiment, the average grain size is reduced by at least about 50%. In another preferred embodiment where the single piece of bulk metal is 7075 aluminum, the average grain size of the segment treated is reduced from on the order of more than 20 microns to on the order of less than 10 microns, preferably less than about 8 microns, more preferably to less than about 6 microns.

The fine-grained region exhibits superplasticity at elevated temperature. The temperature and optimum strain rate for superplasticity are dependent on the material composition and extent of microstructural refinement during friction stir processing. With regard to composition, for example, materials with a good amount of grain boundary pinning precipitates, e.g. Zr-containing aluminum alloys that have Al$_3$Zr particles, help in refining and maintaining very fine grain size. This in turn leads to high strain rate superplasticity and low temperature superplasticity.

As a general proposition, and as explained in R. S. Mishra, T. R. Bieler and A. K. Mukherjee, Superplasticity in powder metallurgy aluminium alloys and composites, Acta Metall. Mater., 43, 877 (1995), optimum strain rate decreases as grain size increases. Also, the superplastic temperature can change with grain size. Therefore, by manipulating the grain size it is possible to (a) increase the superplastic strain rate, and (b) decrease the superplastic temperature. Both aspects have attractive technological significance in the context of this invention. The aim of achieving high strain rate superplasticity or low temperature superplasticity depends on the final objective. For example, decreasing the grain size can increase the superplastic forming rates. In aluminum alloys, high strain rate superplasticity is observed at higher homologous temperatures. Microstructural refinement can lead to significant lowering of the superplastic temperature. For example, a commercial 1420-Al alloy with ultrafine grain microstructure exhibits high strain rate superplasticity ($10^{-2}$–$5\times 10^{-1}$ s$^{-1}$) in the temperature range of 250–350 C. This is a considerable enhancement over the conventionally processed 6 micron grain size 1420-Al that exhibits superplasticity at $4\times 10^{-4}$ s$^{-1}$ and 450 C. However, the ultrafine grained materials are likely to exhibit some grain coarsening during superplasticity even at these relatively lower temperatures. If the processing rate is of primary concern, one can superplastically form at high temperature at the expense of microstructural coarsening. Another advantage of high temperature superplasticity is the low flow stress that is encountered. Cavitation during superplasticity is linked with the value of the flow stress. Lower flow stresses, because of the nanocrystalline structure and high temperature, are likely to help in reducing cavitation during superplastic forming. Cavitation leads to degradation in post-forming mechanical properties and this can be reduced/avoided by high temperature superplasticity.

On the other hand, low temperature superplasticity is desirable for retaining the fine microstructure. Finer microstructure is desirable for higher strength, ductility, and fatigue properties; and low temperature superplastic forming leads to attractive post-forming properties.

The friction stirring reduces flow stress in the bulk metal such that the segment of the bulk metal has a high temperature flow stress prior to friction stirring which is relatively greater than the high temperature flow stress of the corresponding segment of the superplastic metal blank resulting from friction stirring. The flow stress of the segment of the bulk metal prior to friction stirring is at least about 30% greater than the flow stress of the corresponding segment of the superplastic metal blank.

The friction stirring process as described above yields a single superplastic metal blank which, in accordance with this invention, is deformed to yield a shaped metallic component. The deformation is accomplished by forging, rolling, drawing, bending, extruding, gas forming, punching, and stamping.

Figure 2:
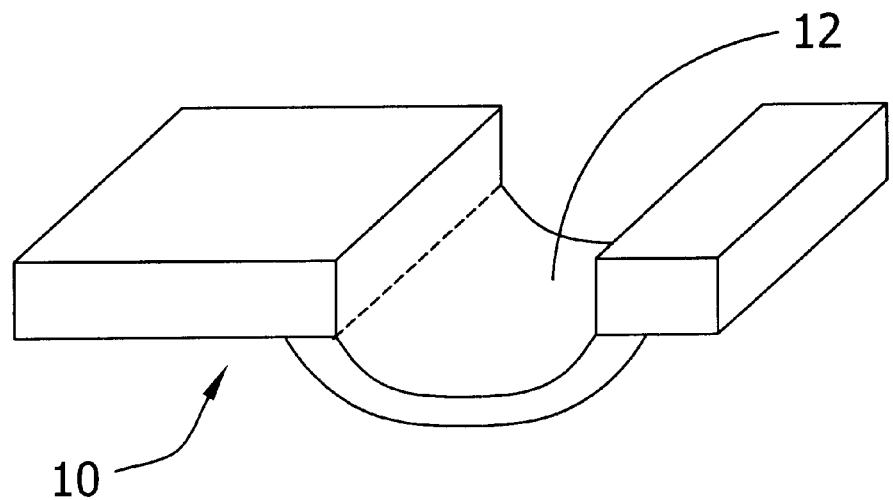

FIG. 1 illustrates a cross-section of a flat metal sheet 10 before forming and FIG. 2 illustrates a cross-section of a flat metal sheet after the deformation of the invention. In this illustration, only the middle portion 12 of the single piece of bulk metal was subjected to friction stirring. As shown in FIG. 2, only the friction stirred region 12 is deformed during superplastic forming. In this particular instance, the friction stirred superplastic segment of the superplastic metal blank is ductile enough to deform under the selected forming pressure, but the rest of the blank is not.

Figure 3:
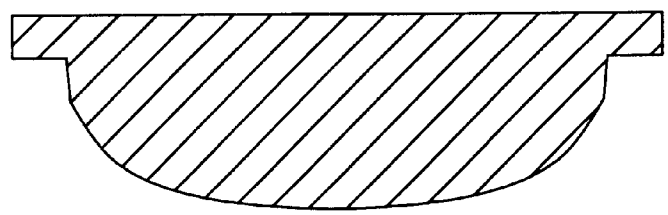
FIGS. 3 and 4 cross sections of a piece of material before and after the forming process of the invention.
Figure 4:
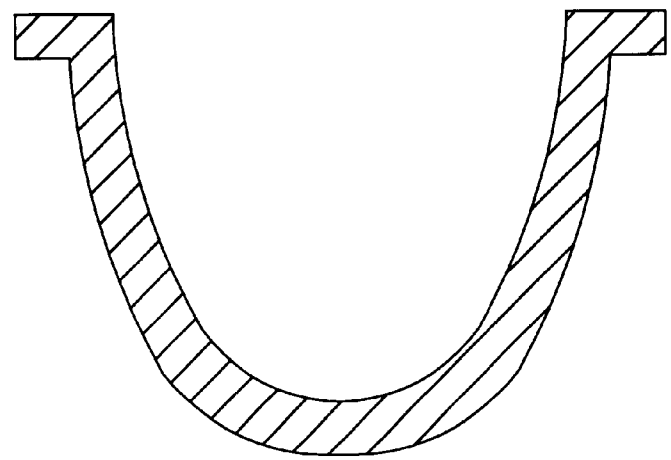

FIG. 3 shows a cross-section of a contoured sheet before forming and FIG. 4 shows a cross-section of a contoured sheet after forming. These figures illustrate the thinning that occurs during gas forming or other deformation is anticipated in accordance with one embodiment of the invention. A theoretical profile, accounting for the thinning, is calculated which provides sufficient bulk material to ultimately provide the deformed shape of uniform thickness, even at the center point or other point of greater deformation, as illustrated. This capability is facilitated by the invention in that superplasticity is imparted to relatively thicker cross sections.

Figure 5:
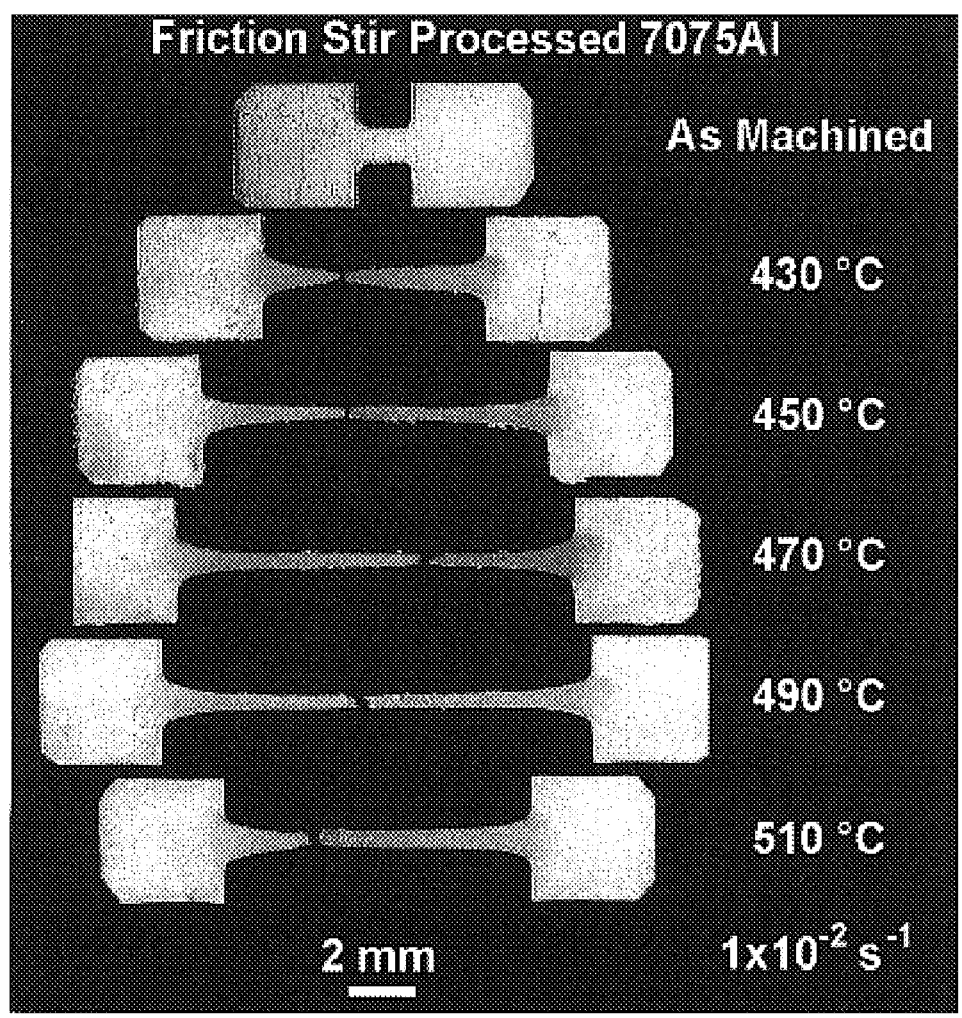
FIGS. 5 and 13 are photographs of superplastically deformed specimens.

FIG. 5 is a photograph showing the appearance of the specimens before and after superplastic deformation at 490 C. There is an order of magnitude improvement in optimum strain rate for superplasticity over the best results reported in the prior art.

In one embodiment of the invention the single piece of bulk metal is treated by overlapping passes with the friction stir tool to refine the microstructure in the region of interest.

Figure 6:
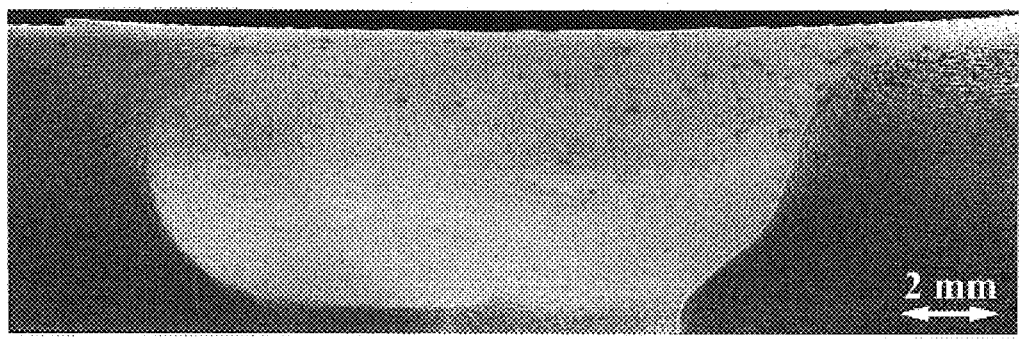
FIG. 6 is a photograph illustrating an example of overlapping deformed regions using two passes.

FIG. 6 is a photograph illustrating an example of overlapping deformed regions using two passes. For greater commercial viability, entire sheets or specific locations within a sheet may be rastered with the friction stir process. The results show that the grain refinement during both passes is similar and the overlap region does not have any adverse microstructural change.

Among the numerous advantages of the foregoing process is that it involves imparting grain refinement without reducing the thickness of the bulk metal. This is a distinct advantage over certain prior art grain refinement processes which involve sheet rolling. In conventional thermo-mechanical processing involving sheet rolling, the sheet thickness is reduced with each pass. To give sufficient total strain for grain refinement, a number of passes are applied resulting in sheets generally less than 2.5 mm thick. With the method of the invention, in contrast, the thickness of the sheet does not change with each pass.

A further advantage of this process is that because friction stir processing is applicable to sheets up to, for example, 25 mm thick in aluminum alloys, the overall forming process of the invention is applicable to superplastic forming of relatively thick sheets.

Also, while the superplastic forming rates of conventionally processed commercial aluminum alloys are quite low, on the order of from $10^{-4}$ to $10^{-3}$ $s^{-1}$, in accordance with this invention they are substantially increased. A friction stir processed 7075 Al alloy exhibits superplasticity at strain rates as high as $10^{-1}$ $s^{-1}$ after processing according to this invention, and every greater strain rates have been seen in other materials. Higher forming rates translate to higher production rates, higher productivity, and therefore reduced production costs.

The invention encompasses an embodiment where only a segment of the single piece of bulk metal is rendered superplastic. This is advantageous where the geometry of the final component is such that only a segment of the metal blank has to be superplastic. This results in material treatment savings as compared to other thermo-mechanical processes which are not amenable to selective grain size refinement. The single piece of bulk metal comprises a first segment which is subjected to friction stirring and a second segment which is not. This also provides a versatile way of producing gas-formed components with intricate design.

A conventional cast microstructure is typically converted to a superplastic microstructure in many steps. The process of the invention is optionally employed directly on a continuously cast sheet thereby eliminating several steps. And powder metallurgy processed aluminum alloys require extensive thermo-mechanical processing to break down the prior particle boundaries that contain alumina film. The friction stir process results in a very uniform microstructure directly from a hot pressed powder metallurgy sheet.

The uniformity of the microstructure is a significant advantage which further distinguishes the invention from previous superplastic forming methods. Even where the thickness of the superplastic metal blank is greater than about 1 inch, the grain size is substantially uniform throughout a segment of the superplastic metal blank corresponding to the segment of the bulk metal treated by frictional stirring. Other forming methods which employ previous thermo-mechanical components for imparting superplasticity, in contrast, do not tend to form repeatably uniform microstructures. With one embodiment of the invention, for example, the average grain size of any 150 micron by 150 micron cross section of the friction stirred segment of the superplastic metal blank differs by no more than 20% from the grain size of any other 150 micron by 150 micron cross section of the segment of the superplastic metal blank.

A further embodiment of the invention takes advantage of the fact that during superplastic forming, the cross-section of material changes and thickness variation sets in due to strain variation. The strain variation during superplastic forming is mathematically predicted, and this mathematical projection is used to establish parameters for casting a contoured sheet as in FIG. 3 for use as the single piece of bulk metal processed according to the invention. The contoured sheet is grain refined by using a variable height friction stir tool as disclosed, for example, in U.S. Pat. No. 5,718,366. The contoured sheet after superplastic forming will produce uniform thickness.

The following working example further illustrates the invention.

EXAMPLE

Figure 7:
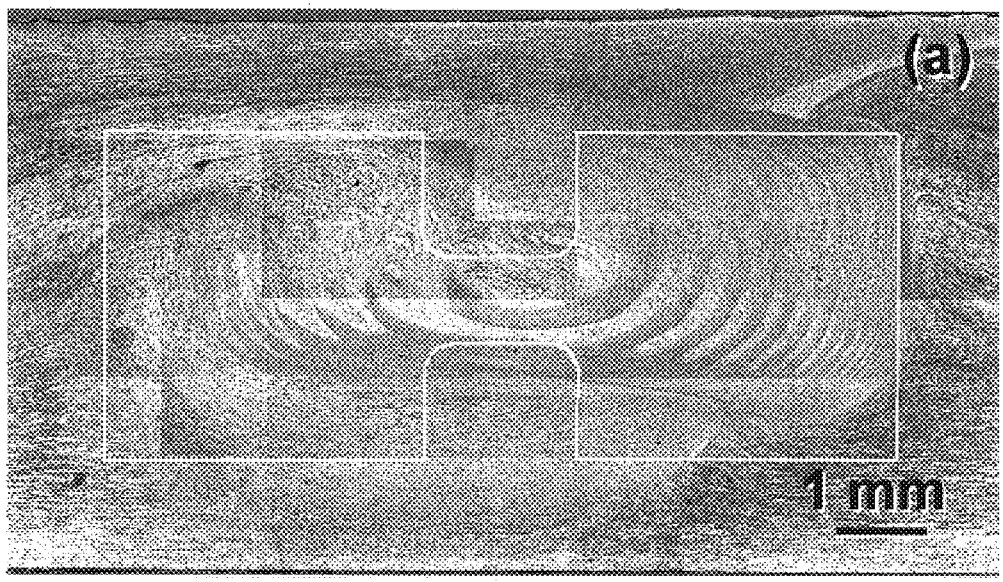
FIG. 7 is a photomicrograph of a piece of bulk metal treated according to the invention.

An 6.35 mm thick 7075-T651 Al plate with nominal composition in wt % 5.6 Zn, 2.5 Mg, 1.6 Cu, 0.23 Cr, and balance Al was subjected to a single pass friction stir process zone of 0.3 m length. The tool traverse speed was 15 cm/min; rotation rate 200 to 600 rpm; tilt angle 1 degree to 3 degrees. Tensile specimens with 1 mm gage length were machined in the transverse direction as shown in FIG. 7 where the gage length was centered in the fine grain friction stir processed nugget. The specimens were ground and polished to a thickness of roughly 0.5 mm. All tensile tests were carried out using a custom-built, computer-controlled bench-top tensile testing machine at constant strain rate. The microstructure of friction stir processed specimens was examined by optical, orientation imaging microscopy (OIM) and transmission electron microscopy (TEM).

Figure 8:
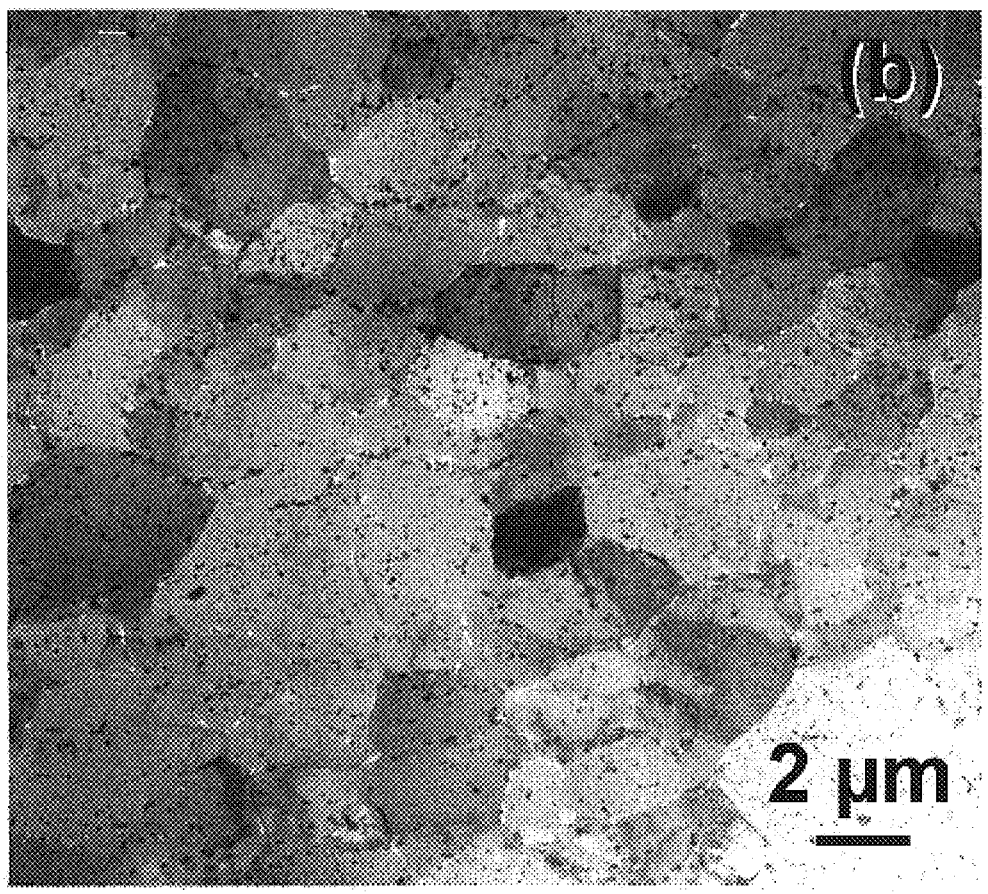
FIG. 8 is a bright field transmission electron micrograph of metal produced by the present invention.

FIG. 7 presents a montage of optical micrographs showing a transverse cross section of the as-processed friction stir region. The flow lines within the nugget and the elliptical shape are typical of the friction stir process. The friction stir nugget shows the region that experienced extensive plastic deformation, producing a grain size much finer than the original rolled structure. FIG. 8 shows a bright field transmission electron micrograph of the nugget region. The average grain size, determined by mean linear intercept technique (grain size=1.78×mean linear intercept), was 3.3+/−0.4 micron.

Figure 9:
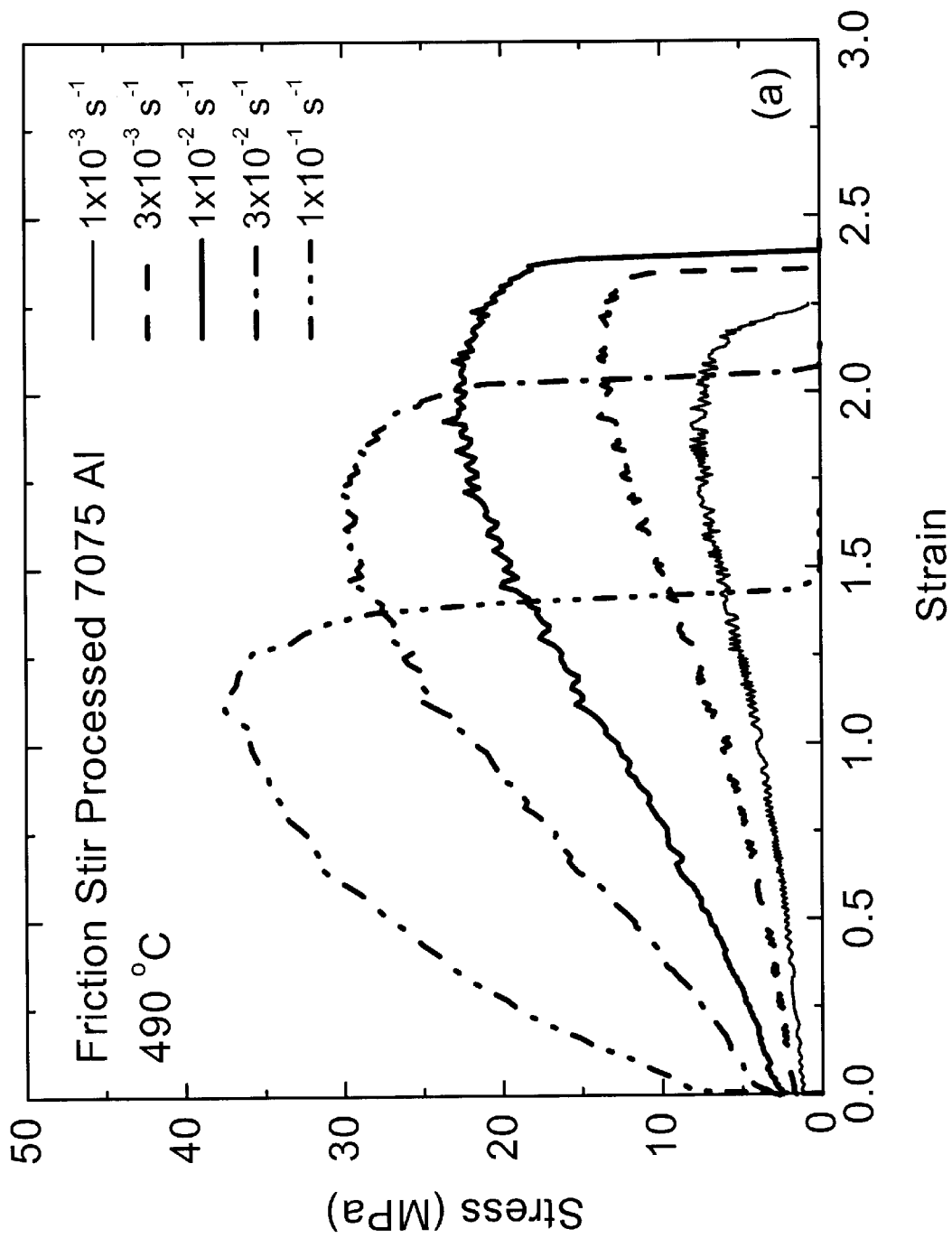
FIGS. 9–12 and 14 are line graphs.
Figure 10:
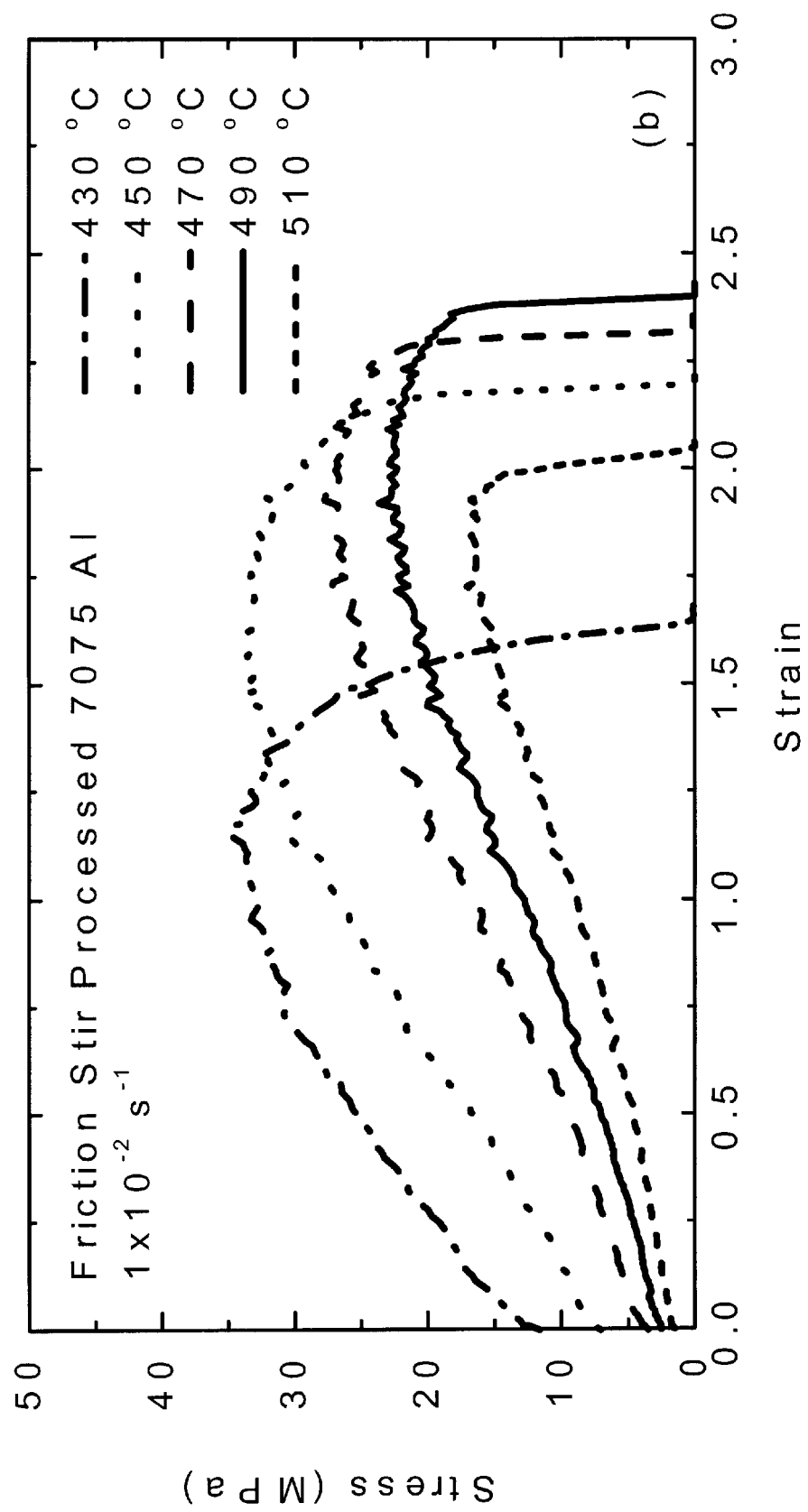
Figure 11:
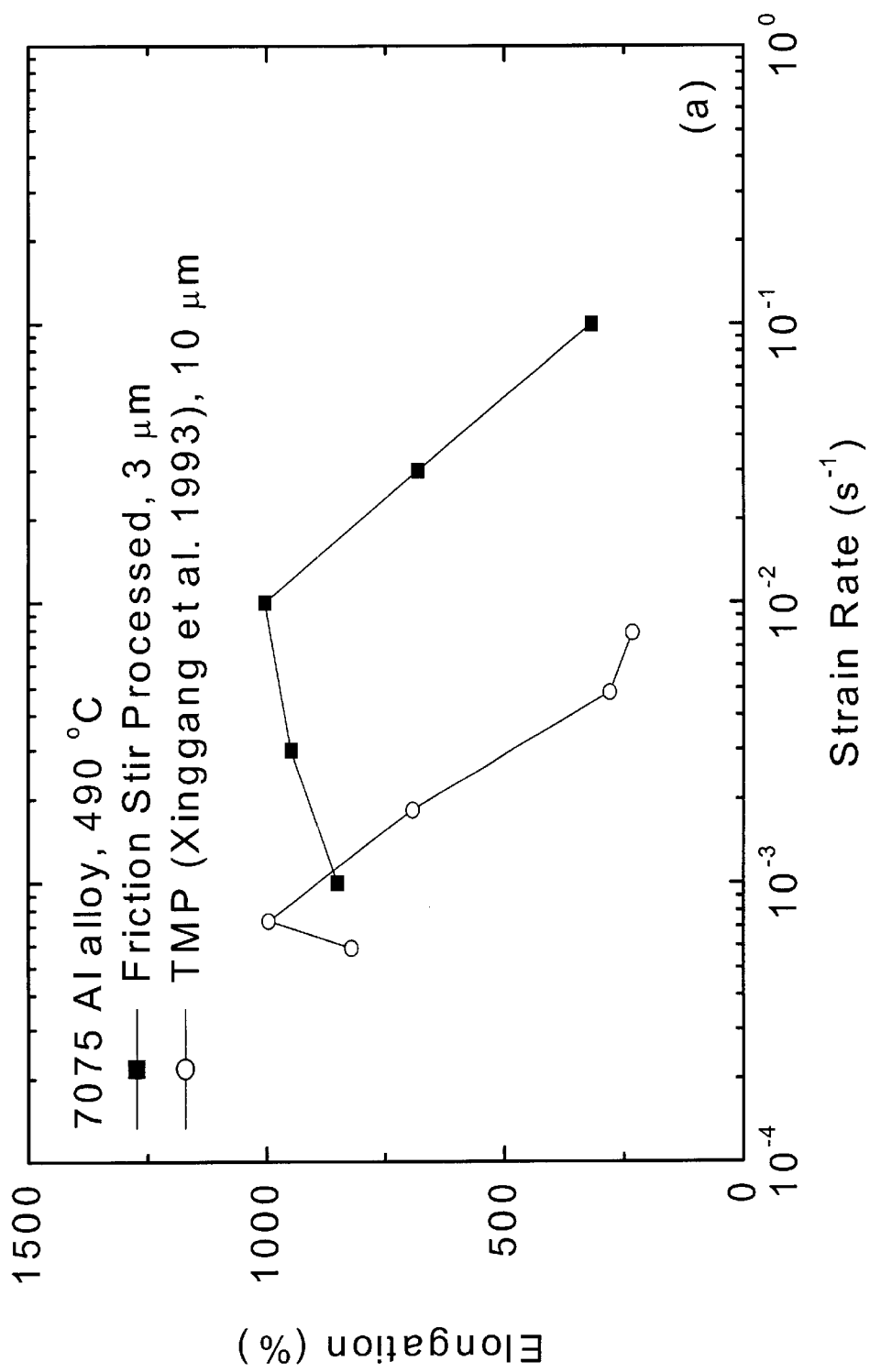
Figure 12:
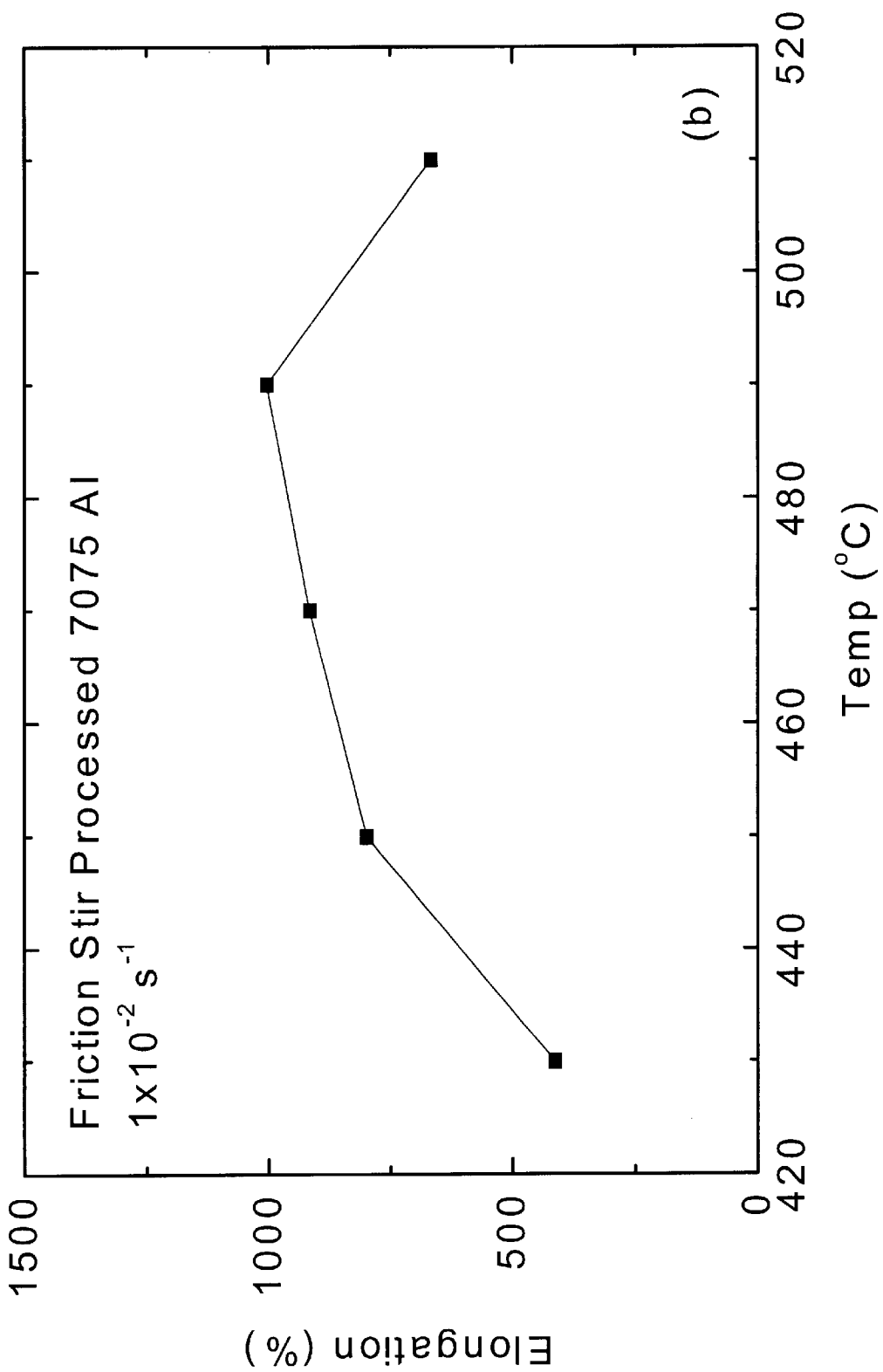

The stress-strain behavior of the friction stir processed nugget is shown in FIGS. 9 and 10 as a function of strain rate and temperature. The optimum strain rate for maximum elongation at 490 C. was $1 \times 10^{-2}$ $s^{-1}$. However, even at strain rates up to $1 \times 10^{-1}$ $s^{-1}$, a relatively high elongation was achieved. All the flow curves showed extensive strain hardening. The level of strain beyond the peak stress was limited. At a strain rate of $1 \times 10^{-2}$ $s^{-1}$, the optimum temperature for maximum elongation was 490 C. The variation of ductility with strain rate and temperature is illustrated in FIGS. 11 and 12. The ductility at $1 \times 10^{-2}$ $s^{-1}$ and 490 C. was >1000%.

Figure 13:
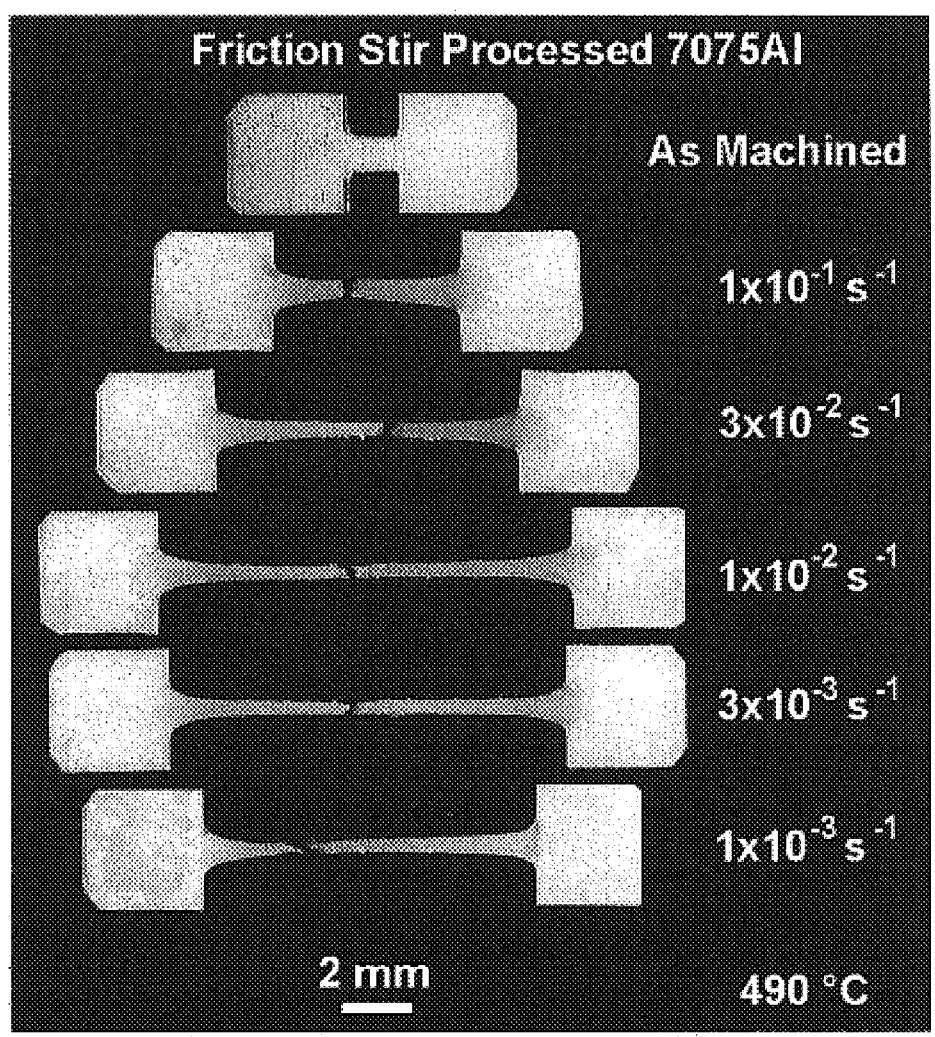

For comparison, the data of Xinggang et al. (Acta Metall. Mater. 41, 2721 (1993)) are included in FIG. 11. The increase in optimum strain rate by more than an order of magnitude is noteworthy. The ductility at $1 \times 10^{-1}$ $s^{-1}$ and 490 C. was 318%. Considering that the required ductility for most forming operations is less than 200%, the superplastic ductility at such a high strain rate in commercial aluminum alloys is highly desirable. This shows the effectiveness of friction stir processing to yield a microstructure in one step that is amenable to high strain rate superplasticity. The superplastically deformed specimens at 490 C. are shown in FIG. 13. The uniform elongation in the gage region is typical of superplastic flow.

Figure 14:
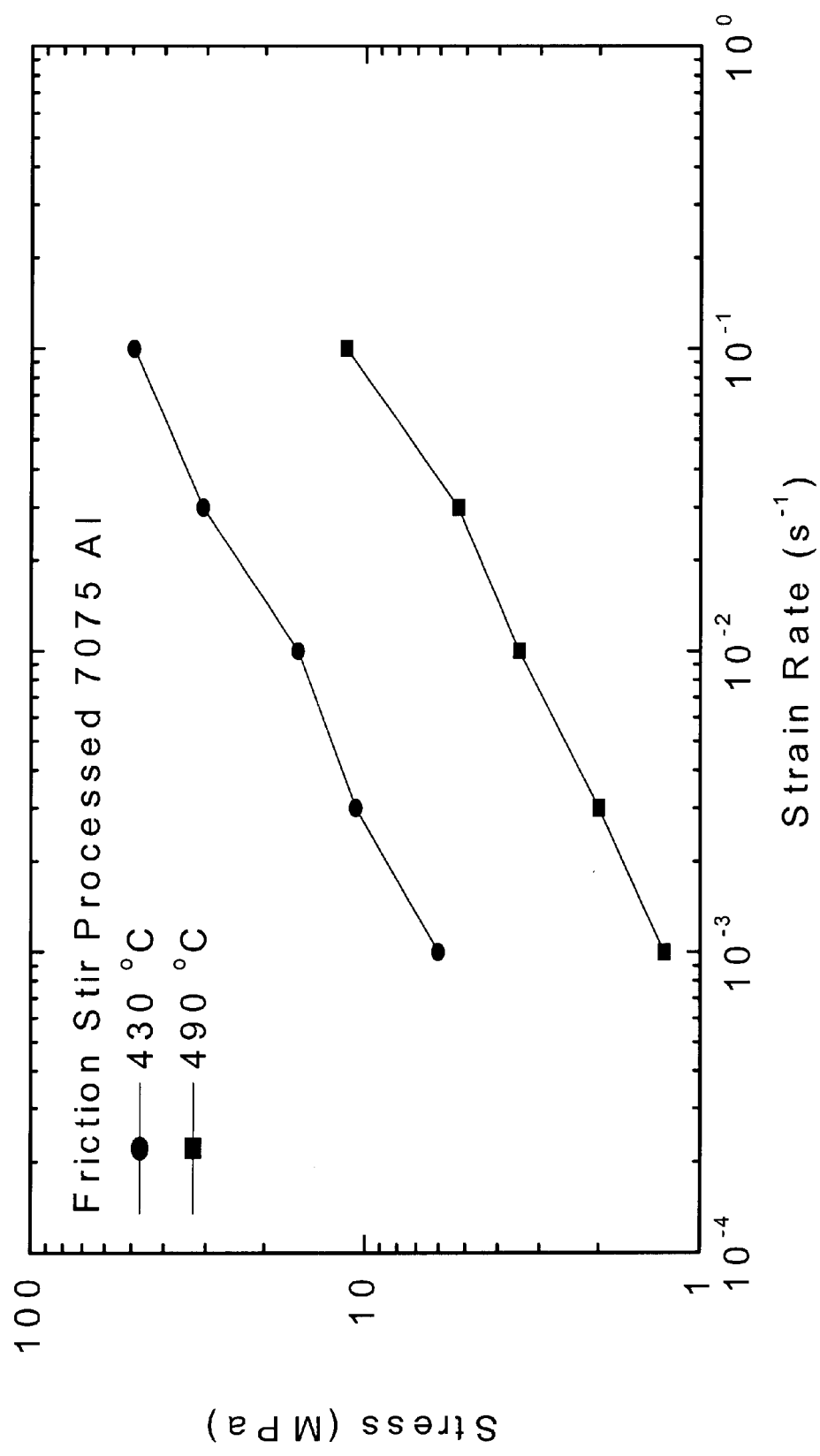

The variation of stress with strain rate is shown in FIG. 14 at 430 C. and 490 C. The apparent stress exponent is on the order of 2.2. This value is quite close to the theoretical stress exponent value of 2 predicted for grain boundary sliding related deformation mechanisms (Mater. Sci. Eng. 8, 83 (1971)). The activation energy was estimated to be 239 kJ mol$^{-1}$. This value is much higher than the value of activation energy for lattice or grain boundary self-diffusion, which are 142 kJ mol$^{-1}$ and 84 kJ mol$^{-1}$, respectively (Frost et al. Deformation Mechanism Maps, p. 21 (1982)). Generally, the activation energy for superplasticity in aluminum alloys is close to that for grain boundary diffusion (Acta Metall. Mater. 43, 877 (1995)). In the relevant temperature range, the volume fraction of second phase precipitates is temperature dependent. The increase in volume fraction of precipitates at lower testing temperatures will reduce the kinetics of superplastic flow. This is likely to raise the apparent activation energy and make difficult the interpretation of experimental values.

The experimental results demonstrate the feasibility of friction stir processing to produce a microstructure amenable to high strain rate superplasticity in a commercial aluminum alloy. Optimum superplasticity was observed in a friction stir processed 7075 Al alloy at $1 \times 10^{-2}$ s$^{-1}$ and 490 C.

Figure 15:
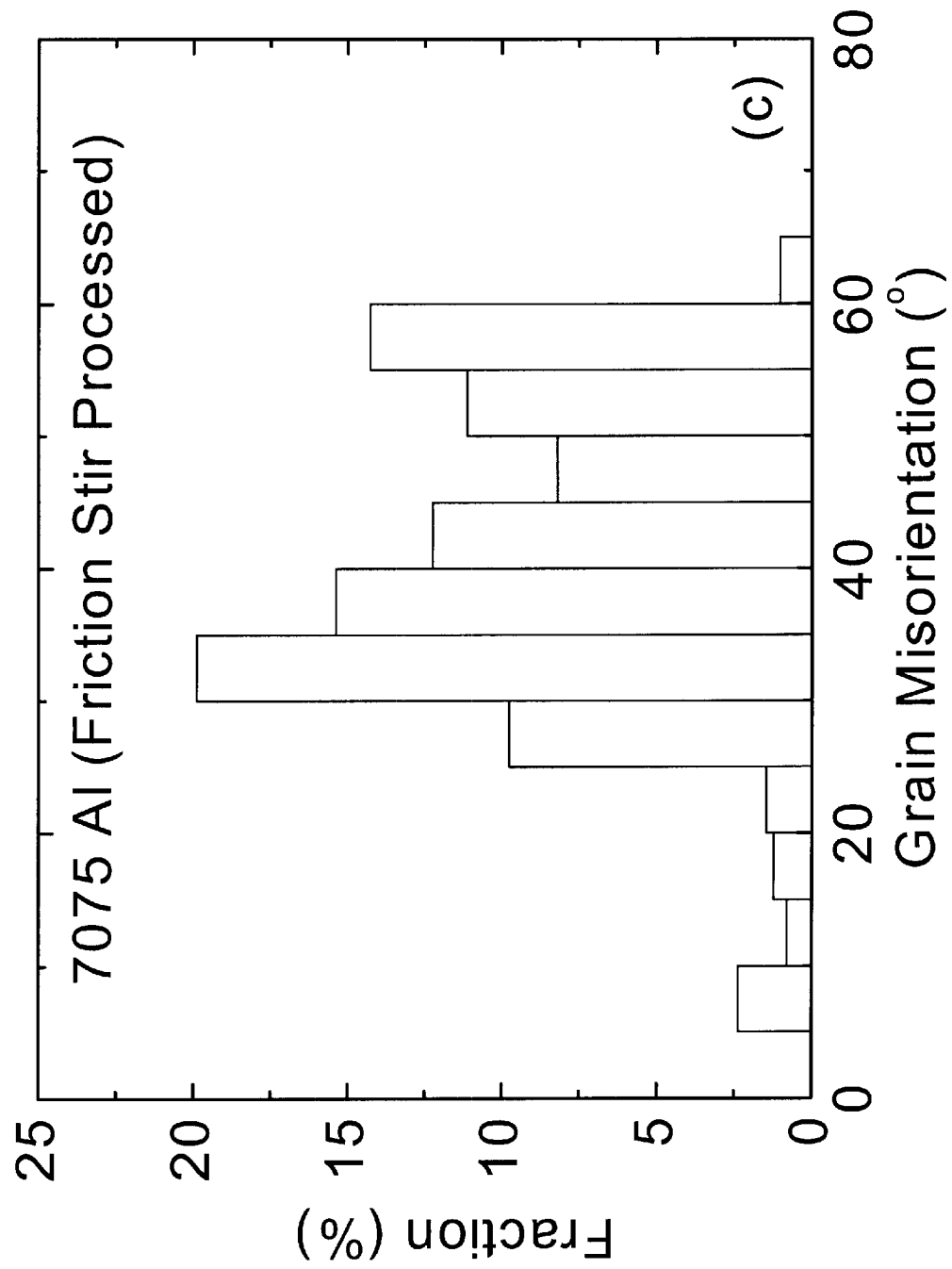
FIG. 15 is a bar graph.

FIG. 15 is a bar graph showing that the grain boundary misorientation distribution in the friction stirred zone indicates formation of high angle grain boundaries in this region. This FIG. demonstrates that friction stir processing of 7075 Al produces a large majority of high angle grain boundaries, which are in significant part responsible for superplastic behavior. In this particular embodiment of the invention, more than 90% of the grain boundaries are characterized by greater than a 15 degree misorientation.

These results illustrate that friction stir processing yields a microstructure conducive to high strain rate superplasticity in commercial aluminum alloys. Optimum superplasticity was observed in a friction stir processed 7075 Al alloy at $1 \times 10^{-2}$ s$^{-1}$ and 490 C. Moreover, superplasticity is achieved in thicker section aluminum sheet via friction stir processing. This technique achieves a very fine grain size directly from a cast structure in commercial alloys. The technique therefore yields a simple three-step manufacturing process: 1) cast, 2) friction stir, and 3) superplastic form.

All literature and patent references are incorporated herein by reference in their entirety It should be understood that the foregoing relates only to a limited number of embodiments that have been provided for illustration purposes only. It is intended that the scope of invention is defined by the appended claims and that modifications to the embodiments above may be made that do not depart from the scope of the invention.

What is claimed is:

1. A method for producing a shaped metallic component comprising:
    friction stirring at least a segment of a single piece of bulk metal to impart superplasticity thereto and thereby yield a single superplastic metal blank from said single piece of bulk metal; and
    deforming the superplastic metal blank to form a shaped metallic component from said single superplastic metal blank.

2. The method of claim 1 wherein said deforming is selected from the group of metallic deformation processes consisting of forging, rolling, drawing, bending, extruding, gas forming, punching, and stamping.

3. The method of claim 1 wherein the single piece of bulk metal has a non-uniform thickness.

4. The method of claim 1 wherein the single piece of bulk metal is contoured with thickness variations with predetermined thickness variations calculated as a function of expected strain variation during subsequent deformation and geometry of the shaped metallic component to be formed thereby.

5. The method of claim 1 wherein said single piece of bulk metal comprises a first segment which is subjected to said friction stirring and a second segment which is not subjected to said friction stirring.

6. The method of claim 1 comprising friction stirring the bulk metal by inserting a probe into the bulk metal and rotating the probe thereby generating frictional heat between the bulk metal and the probe to impart the superplasticity and thereby yield the superplastic metal blank.

7. The method of claim 6 wherein a shoulder carried by the probe and rotating therewith is contacted with a surface of the bulk metal thereby generating frictional heat between the bulk metal and the shoulder.

8. The method of claim 7 wherein said deforming is accomplished at least in part by mechanical forces applied by, and metal containment achieved by, the shoulder of the probe.

9. The method of claim 1 wherein the ductility of the segment of the bulk metal prior to friction stirring is less than about 20% and is non-uniform and wherein said friction stirring increases the ductility such that the ductility of a corresponding segment of the superplastic metal blank is greater than about 100% and is relatively uniform.

10. The method of claim 1 wherein the friction stirring reduces flow stress in the bulk metal such that the segment of the bulk metal has a flow stress prior to friction stirring which is relatively greater than a flow stress of the corresponding segment of the superplastic metal blank.

11. The method of claim 10 wherein said flow stress of the segment of the bulk metal prior to friction stirring is at least about 30% greater than the flow stress of the corresponding segment of the superplastic metal blank.

12. The method of claim 1 wherein the thickness of the single piece of bulk metal is less than about 0.02 inch.

13. The method of claim 1 wherein the thickness of the single piece of bulk metal is greater than about 1 inch.

14. The method of claim 13 wherein the thickness of the superplastic metal blank is greater than about 1 inch and wherein the grain size is substantially uniform throughout a segment of the superplastic metal blank corresponding to the segment of the bulk metal.

15. The method of claim 14 wherein the average grain size of any 150 micron by 150 micron cross section of a segment of the superplastic metal blank corresponding to the segment of the metal blank subjected to friction stirring differs by no more than 20% from the grain size of any other 150 micron by 150 micron cross section of said segment of the superplastic metal blank.

16. The method of claim 1 wherein more than 90% of grain boundaries of the superplastic metal blank are characterized by a grain boundary misorientation of more than about 15 degrees.

17. A method for producing a shaped metallic component comprising:
    friction stirring at least a segment of a single piece of bulk metal to impart superplasticity thereto and thereby yield a single superplastic metal blank from said single piece of bulk metal; and deforming the superplastic metal blank by a process selected from the group of metallic deformation processes consisting of forging, rolling, drawing, bending, extruding, gas forming, punching, and stamping to form a shaped metallic component from said single superplastic metal blank.

18. A method for producing a shaped aluminum alloy component comprising:

friction stirring at least a segment of a single piece of bulk aluminum alloy to impart superplasticity thereto and thereby yield a single superplastic aluminum alloy blank from said single piece of bulk aluminum alloy; and deforming the superplastic aluminum alloy blank to form a shaped aluminum alloy component from said single superplastic aluminum alloy blank.

19. A method for producing a shaped metallic component comprising:

treating a single piece of bulk metal by friction stirring a first segment of the single piece of bulk metal to impart superplasticity thereto and avoiding friction stirring a second segment of the single piece of bulk metal to thereby yield a single superplastic metal blank from said single piece of bulk metal having a first superplastic segment and a second non-superplastic segment; and deforming the first superplastic segment of the superplastic metal blank to form a shaped metallic component from said single superplastic metal blank.

20. A method for producing a shaped metallic component comprising:

friction stirring at least a segment of a single piece of bulk metal to impart superplasticity thereto by inserting a probe into the bulk metal and rotating the probe thereby generating frictional heat between the bulk metal and the probe to impart the superplasticity and thereby yield a single superplastic metal blank from said single piece of bulk metal; and deforming the superplastic metal blank to form a shaped metallic component from said single superplastic metal blank.

21. A method for producing a shaped metallic component comprising:

friction stirring at least a segment of a single piece of bulk metal to impart superplasticity thereto by inserting a probe into the bulk metal and rotating the probe thereby generating frictional heat between the bulk metal and the probe to impart the superplasticity and thereby yield a single superplastic metal blank from said single piece of bulk metal;

wherein a shoulder carried by the probe and rotating therewith is contacted with a surface of the bulk metal thereby generating frictional heat between the bulk metal and the shoulder; and deforming the superplastic metal blank to form a shaped metallic component from said single superplastic metal blank;

wherein said deforming is accomplished at least in part by mechanical forces applied by, and metal containment achieved by, the shoulder of the probe.

22. A method for producing a shaped metallic component comprising:

friction stirring at least a segment of a single piece of bulk metal having an average grain size of at least about 20 microns to reduce the average grain size to less than about 10 microns and impart superplasticity thereto and thereby yield a single superplastic metal blank from said single piece of bulk metal; and deforming the superplastic metal blank to form a shaped metallic component from said single superplastic metal blank.

23. A method for producing a shaped metallic component comprising:

friction stirring at least a segment of a single piece of bulk metal having a ductility of less than about 20% to increase said ductility to at least about 100% and impart superplasticity thereto and thereby yield a single superplastic metal blank from said single piece of bulk metal; and deforming the superplastic metal blank to form a shaped metallic component from said single superplastic metal blank.

24. A method for producing a shaped metallic component comprising:

friction stirring at least a segment of a single piece of bulk metal to impart superplasticity thereto and thereby yield a single superplastic metal blank from said single piece of bulk metal;

wherein the friction stirring reduces flow stress in the bulk metal such that the segment of the bulk metal has a flow stress prior to friction stirring which is relatively greater than a flow stress of the corresponding segment of the superplastic metal blank; and deforming the superplastic metal blank to form a shaped metallic component from said single superplastic metal blank.

25. The method of claim 24 wherein said flow stress of the segment of the bulk metal prior to friction stirring is at least about 30% greater than the flow stress of the corresponding segment of the superplastic metal blank.

26. A method for producing a shaped metallic component comprising:

friction stirring at least a segment of a single piece of bulk metal having a thickness of at least about 1 inch to impart superplasticity thereto and thereby yield a single superplastic metal blank having a thickness of at least about 1 inch from said single piece of bulk metal; and deforming the superplastic metal blank to form a shaped metallic component from said single superplastic metal blank.

27. The method of claim 26 wherein the single superplastic metal blank has a substantially uniform grain size throughout the segment of the superplastic metal blank corresponding to the segment of the bulk metal subjected to friction stirring.

28. A method for producing a shaped metallic component comprising:

friction stirring at least a segment of a single piece of bulk metal to impart superplasticity thereto and thereby yield a single superplastic metal blank from said single piece of bulk metal;

wherein the average grain size of any 150 micron by 150 micron cross section of a segment of the superplastic metal blank corresponding to the segment of the bulk metal subjected to friction stirring differs by no more than 20% from the grain size of any other 150 micron by 150 micron cross section of said segment of the superplastic metal blank; and deforming the superplastic metal blank to form a shaped metallic component from said single superplastic metal blank.

29. A method for producing a shaped metallic component comprising:

friction stirring at least a segment of a single piece of bulk metal to reduce the average grain size and impart superplasticity thereto and thereby yield a single superplastic metal blank from said single piece of bulk metal;

wherein more than 90% of grain boundaries of the superplastic metal blank are characterized by a grain boundary misorientation of more than about 15 degrees; and deforming the superplastic metal blank to form a shaped metallic component from said single superplastic metal blank.

30. A method for producing a shaped metallic component comprising:

friction stirring at least a segment of a single piece of bulk metal having an average grain size of at least about 20 microns and a ductility of less than about 20% by inserting a probe into the bulk metal and rotating the probe thereby generating frictional heat between the bulk metal and the probe to reduce the average grain size to less than about 10 microns, increase the ductility to at least about 100%, impart superplasticity thereto, and reduce flow stress thereof, and thereby yield a single superplastic metal blank from said single piece of bulk metal; and deforming the superplastic metal blank by a process selected from the group of metallic deformation processes consisting of forging, rolling, drawing, bending, extruding, gas forming, punching, and stamping to form a shaped metallic component from said single superplastic metal blank.

* * * * *